United States Patent
Lopes Cardoso et al.

(10) Patent No.: US 12,012,497 B2
(45) Date of Patent: Jun. 18, 2024

(54) RECOVERED CARBON BLACK AND COMPOSITE MATERIAL COMPRISING SAID RECOVERED CARBON BLACK

(71) Applicant: BLACK BEAR CARBON B.V., Eindhoven (NL)

(72) Inventors: Martijn Lopes Cardoso, Eindhoven (NL); Pieter Cornelis Tobias Ter Kuile, Eindhoven (NL); Arnoldus Henricus Adrianus Verberne, Eindhoven (NL); Jan Anne Jonkman, Eindhoven (NL); Cristina Zanzottera, Eindhoven (NL); Adrianus Hendrikus Josephus Johannes Van Oorschot, Eindhoven (NL); Joost Raimond, Eindhoven (NL)

(73) Assignee: BLACK BEAR CARBON B.V., Eindhoven (NL)

( * ) Notice: Subject to any disclaimer, the term of this patent is extended or adjusted under 35 U.S.C. 154(b) by 756 days.

(21) Appl. No.: 17/263,808

(22) PCT Filed: Jul. 22, 2019

(86) PCT No.: PCT/EP2019/069638
§ 371 (c)(1),
(2) Date: Jan. 27, 2021

(87) PCT Pub. No.: WO2020/020810
PCT Pub. Date: Jan. 30, 2020

(65) Prior Publication Data
US 2022/0153955 A1     May 19, 2022

(30) Foreign Application Priority Data

Jul. 27, 2018 (EP) .................... 18186088

(51) Int. Cl.
*C08K 3/04* (2006.01)
*B60C 1/00* (2006.01)
*C08L 25/10* (2006.01)
*C09C 1/48* (2006.01)

(52) U.S. Cl.
CPC ................. *C08K 3/04* (2013.01); *B60C 1/00* (2013.01); *C09C 1/482* (2013.01); *C01P 2004/51* (2013.01); *C08K 2201/005* (2013.01); *C08K 2201/006* (2013.01); *C08L 25/10* (2013.01)

(58) Field of Classification Search
None
See application file for complete search history.

(56) References Cited

U.S. PATENT DOCUMENTS

| | | | |
|---|---|---|---|
| 5,087,436 A | 2/1992 | Roy | |
| 5,229,099 A * | 7/1993 | Roy | .......................... C10G 1/10 |
| | | | 423/449.7 |
| 5,853,687 A | 12/1998 | Morlec et al. | |
| 2010/0249353 A1* | 9/2010 | Macintosh | .............. C01B 32/05 |
| | | | 423/449.1 |
| 2012/0136110 A1 | 5/2012 | Fuchs et al. | |
| 2016/0083657 A1 | 3/2016 | Pech | |
| 2017/0114222 A1 | 4/2017 | Verberne | |

FOREIGN PATENT DOCUMENTS

| | | |
|---|---|---|
| CN | 107383459 | 11/2017 |
| KR | 20130111811 A * | 10/2013 |

OTHER PUBLICATIONS

Database WPI Week 201804, Thomson Scientific, Long, GB; AN 2017-817076 XP002787145.

* cited by examiner

*Primary Examiner* — Richard A Huhn
(74) *Attorney, Agent, or Firm* — Casimir Jones, S.C.; Robert A. Goetz

(57) ABSTRACT

The present invention relates to a filler comprising a recovered carbon black having an iodine adsorption number, measured according to ASTM D-1510-17 of between 9 g/kg and 160 g/kg, preferably between 115 g/kg and 140 g/kg. The present invention also relates to a composite material comprising a rubber and a filler according to the invention. Moreover, the present invention relates to an article comprising said composite material, wherein the article is for example a tyre, such as, a passenger car tyre, a truck tyre, an agricultural tyre, an OTR (off-the-road) tyre, an aircraft tyre, a solid tyre, a bicycle tyre or a mining tyre.

15 Claims, No Drawings

RECOVERED CARBON BLACK AND COMPOSITE MATERIAL COMPRISING SAID RECOVERED CARBON BLACK

BACKGROUND

The present invention relates to a filler comprising a recovered carbon black, to a composite material comprising a rubber and said filler and to an article comprising the composite material.

Rubber compositions are typically composite materials, comprising a rubber matrix and dispersed particles. These dispersed particles, normally known as fillers, promote enhancement of physical properties of the rubber composition. Conventional materials used as fillers are carbon black and silica, such as, for example, precipitated silica, including combinations of carbon black and the silica.

Rubber, being one of the most outstanding materials is widely used in many engineering applications such as automotive, civil and electrical. It has been well established that rubber without filler materials have very low physical strength and of no practical use. Fillers are compounding ingredients added to a rubber compound for the purpose of either reinforcing or cheapening the compound. Moreover, fillers can also be used to modify the physical properties of both unvulcanised and vulcanized rubbers. Typical filler materials include carbon black, calcium silicate, calcium carbonate, silicon dioxide (silica) and clay. Fillers can be classified as black or white (non-black) fillers. Black fillers are more widely used in the rubber industry than white fillers. They are used in tyres, hoses and cable industries. Meanwhile, white fillers are used in the footwear, general rubber goods and automotive industries. In tyres both black fillers, such as carbon black, and white (non-black) fillers, such as silica, are used.

Carbon black is the most popular filler added into the rubber compound due to its ability to enhance the strength properties of rubber vulcanizate as compared to gum vulcanizate; where no filler added. Generally, there are various types of carbon black grades used in the rubber industry such as N-220 ISAF (Intermediate Super Abrasion Furnace), N-330 HAF (High Abrasion Furnace), N-550 FEF (Fast Extruding Furnace) and N-660 GPF (General Purpose Furnace) series. These carbon black grades or classification are known by the person skilled in the art, and refer to the ASTM D1765-14.

However, the choice of carbon black grades for any given rubber formulation must take into account the desired physical properties of the end products, processing methods and costs. European patent application EP 2 457 945 relates to two rubber compositions, namely a silica-rich rubber compound and a carbon black-rich rubber compound without silica coupler and without sulphur curatives. The silica-rich rubber compound contains all of the silica reinforcement for the final rubber composition. The carbon black-rich rubber compound contains all of the rubber reinforcing carbon black for the final rubber composition, wherein the two individual rubber compounds would not be silica coupler-containing reactive rubber compounds. Each of the rubber compounds are prepared by mixing the respective rubber compounds in an internal rubber mixer or on an open cylindrical mill after which the two rubber compounds are mixed together in desirable ratios.

Fillers, then, influence the mechanical and dynamic properties of rubbers. Examples of mechanical properties are tensile strength, ultimate elongation and modulus, reinforcement index M300/M100, abrasion resistance and tear strength over a range of temperatures (e.g. −40° C. to 120° C.). Examples of dynamic properties are flex fatigue, crack propagation, hysteresis, rolling resistance, rebound resilience, dynamic moduli, tangent delta, heat build-up and Payne effect (non-linearity at low strain) over a range of temperatures (e.g. −40° C. to 120° C.). Importantly, rubber can absorb and convert an amount of energy to heat during loading and unloading. The path that the rubber follows during loading is different compared to unloading due to this absorption/conversion of energy. This property is called hysteresis, and it represents the energy dissipated as heat due to material internal friction. Carbon black is a strong influencing factor on the hysteresis of a rubber compound. In the tyre industry, the choice of carbon black is critical for balancing/optimising hysteresis and rolling resistance against wear resistance and wet grip. Other important, yet often conflicting goals of tyre design that are influenced by carbon black are directional stability, steering precision, ride comfort, aquaplaning, tyre weight, longitudinal traction, winter road grip, loose ground grip, acceleration capability, noise generation and electrical resistivity.

Moreover carbon black is a strong influencing factor on the unvulcanised/uncured/green properties of a rubber compound. Such properties include Mooney viscosity, fluidity, extrusion behaviour (e.g. die swell, surface aspects) and tack (the ability of uncured rubber to stick to itself)

Furthermore, a rubber composite materials undergoes aging (in aerobic-, anaerobic-, oil-, outdoor-ageing and ozone conditions) resulting in a change of the mechanical and dynamic properties of the material. In the case of a tire, this undergoes repeated stress cycling during service life causing flex fatigue, heat generation, rise in temperature and the generation of free radicals capable of initiating, propagating and accelerating the aging process. The aging mechanisms can be seen as aerobic or anaerobic or as a quasi-combination of both. Complete absence of oxygen as defined by the term "anaerobic" in reality do not always conform precisely to the definition of zero oxygen, therefore aging may in fact take place under very low concentrations of oxygen where it may be incorrectly assumed that absolutely no oxygen is present, whereas oxygen may indeed be present, but at at very low concentrations.

The oxidative ageing of rubber can be accelerated enormously by the presence of certain heavy metals. Different metals, particularly transition metals, are characterized as poison with respect to rubber. The different sources of metals, which have variable oxidation states, are impurities present in different raw materials used in the tire industry and also the catalysts used in the polymerization process for the manufacturing of different polymers. Natural rubber also contains metallic impurities arising out of nature itself. These metals are hydro-peroxide decomposers. The transition metals Cu and Co serve as good examples. The catalytic mechanism of hydro-peroxide decomposition is well known.

There is a need of a recovered carbon black filler that improves the mechanical and dynamic properties of a rubber compound, without compromising its resistance to aging.

There is also a need of a composite material comprising a rubber and a filler, with reduced rolling resistance and increased resistance to ageing.

Objects of the Invention

It is an object of the present invention to provide a filler that, when present in a composite material comprising a rubber and the filler, improves the mechanical and dynamic properties of the composite material, whilst simultaneously providing good resistance to ageing of this.

Another object of the invention is to provide a composite material comprising a rubber and a filler, with reduced rolling resistance and improved aging retention properties ageing.

Another object of the invention is to provide an article comprising a rubber and a filler, with reduced rolling resistance and improved aging retention properties.

SUMMARY OF THE INVENTION

The invention relates to a filler comprising a recovered carbon black having an iodine adsorption number, measured according to ASTM D-1510-17, of between 95 g/kg and 160 g/kg, preferably between 115 g/kg and 140 g/kg. The filler can further comprise at least one carbon black, classified according to ASTM D1765-14, chosen from the group of N110, N115, N121, N134,N20 N220, N234, N299, N326, N330, N339, N343, N347, N375, N539, N550, N650, N660 and N762. Moreover, the filler can further comprise an amorphous precipitated silica having an Iodine Adsorption Number, measured according to ASTM D-1510-17, of between 30-160 g/kg In an embodiment, the recovered carbon black has an aggregate particle size weight distribution, of which the D99 percentile is less than 2 μm, preferably less than 1 μm and of which the D50 percentile is less than 200 nm, preferably less than 150 nm.

In an embodiment, the recovered carbon black has a content of ZnS of less than 3 wt. %, based on the weight of the recovered carbon black and/or a content of $SiO_2$ of less than 2%, based on the weight of the recovered carbon black. The recovered carbon black can have a content of heavy metals, excluding Zinc, of less than 300 ppm, based on the weight of the recovered carbon black, preferably less than 250 ppm, more preferably less than 200. Moreover, the content of any individual heavy metal can be less than 20 ppm, based on the weight of the recovered carbon black, preferably less than 15 ppm, more preferably less than 10 ppm.

In an embodiment the recovered carbon black has a content of sulphur, excluding sulphur in the form of ZnS, of less than 2 wt. %, wherein said sulphur is present in one or more of the following forms: Carbonile sulphide, Hydrogen sulphide, Carbon disulphide, Dimethyl sulphide, Dimethyl Disulphide, Sulphur dioxide, Methyl sulphide, Methyl mercaptan, Ethyl mercaptan, Isi-propyl mercaptan, Tert-butyl mercaptan, Sec-butyl mercaptan, Pentyl and heavier mercaptans, 2-methylthiophene, 3-methylthiophene, Thiophene, Benzothiophenes, other thiophenes.

In another embodiment, the recovered carbon black has an oxygen content, excluding oxygen in $SiO_2$ and metal oxides, of between 0.001 wt. % and 15 wt. %, based on the weight of the recovered carbon black, preferably between 2 wt. % and 12 wt. %, more preferably between 5 wt. % and 12 wt. %; where said oxygen is present in one or more of the following functional groups: carboxylic, lactone, lactol, phenol, carbonyl, anhydride, aldehyde, pyrone, chromene, pyridone, ether and quinone. Moreover, the recovered carbon black may comprise a coupling agent in a concentration of between 0.01 wt. % and 1 wt. %, based on the weight of the recovered carbon black, and wherein the coupling agent is chosen from the group of titanates, neoalkoxy titanates, zirconates, aluminates or combinations thereof.

In another embodiment, the recovered carbon black comprises a water-soluble plasticizer in a concentration of between 0.01 wt. % and 15 wt. %, based on the weight of the recovered carbon black, and wherein said water-soluble plasticizer is chosen from the group of esters with different combinations of structural glycols, polyols and polyacids.

In another aspect of the invention, the invention relates to a composite material comprising a rubber and a filler according to the invention.

In an embodiment, the rubber is chosen from the group of natural rubber (NR), synthetic polyisoprene rubber (IR), solution type styrene butadiene rubber (S-SBR), emulsion type styrene butadiene rubber (E-SBR) and polybutadiene rubber (BR), or a combination thereof.

In another embodiment, the composite material further comprises one or more additives chosen form the group of zinc oxide, stearic acid, antioxidant, sulphur, accelerator, antiozonant, processing aid, paraffinic, naphthenic, aromatic oil/plasticiser and tackifying resin.

In another aspect of the invention, the invention relates to an article comprising the composite material according to one aspect of the invention, wherein said article is preferably a tyre, more preferably a passenger car tyre, a truck tyre, an agricultural tyre, an OTR (off-the-road) tyre, an aircraft tyre, a solid tyre, a bicycle tyre or a mining tyre.

Definitions

"Carbon black", as used in this application, refers to the generic term for the material produced by the incomplete combustion of heavy petroleum products, with the addition of vegetable oil (furnace process)

"Recovered carbon black (rCB)", as used in this application, means recovered carbon black powder or pellets comprising said carbon black powder. This carbon black powder is recovered from scrap tyres and obtained by pyrolizing said scrap tyres, as described in the patent application EP2794766 in the name of the present applicant.

"Filler", as used in this application, means particles of one or more materials added to a matrix material, e.g. rubber, to either lower the consumption of more expensive binder material or to obtain a composite material with improved properties. These properties can be, for example, mechanical properties, dynamic properties or aging properties.

"Aging", as used in this application, refers to the change of the mechanical and dynamic properties of a composite material comprising a filler. This ageing can be aerobic or anaerobic at low or high temperatures, where said aging occurs under static or dynamic (e.g. cyclic stress/strain) conditions. The present application mainly focusses on the anaerobic ageing at both low and higher temperatures. Ageing can be seen when the composite material undergoes an increase in the elastic modulus and/or a decrease in the elongating to brake.

"Composite material", as used in this application, refers to a material made of two or more constituent materials with different physical or chemical properties. The composite material has characteristics different from the individual components.

"Iodine adsorption number", as used in this application, refers to iodine amount in the adsorption layer of a filler, such as a recovered carbon black or amorphous precipitated silica, represented by mg of Iodine adsorbed by one gram of material (mg/g or g/kg), measured according to ASTM D-1510-17. This parameter gives an estimate of the surface area and porosity of the filler.

"Particle size distribution of D99" or "Particle size distribution of D50", as used in this application, refers to the $99^{th}$ and $50^{th}$ percentile of the particle size distribution, respectively, as measured by volume and using a CPS Disk Centrifuge. The D99 describes a sample of particles whereby 99 vol. % of the particles have a size smaller than the stated particle size distribution. With a D99<x micrometre is meant that 99 vol. % of the particles has a size of less than x micrometre. The D50 describes a sample of particles whereby 50 vol. % of the particles have a size smaller than the stated particle size distribution. With a D50<x micrometre is meant that 50 vol. % of the particles has a size of less than x micrometre.

"Coupling agent", as used in this application, refers to a compound which provides a chemical bond between two dissimilar materials. For example, between a recovered carbon black and a rubber.

DETAILED DESCRIPTION

The present inventors have found that a filler comprising a recovered carbon black having an iodine adsorption number, measured according to ASTM D-1510-17 of between 95 g/kg and 160 g/kg, preferably between 115 g/kg and 140 g/kg, when added to a rubber matrix, reduces the rolling resistance, while also maintaining or improving the resistance to aging of the composite material formed by the rubber and the filler when compared to composite materials comprising furnace ASTM carbon blacks, e.g. N330 and N326. Furthermore, when the composite also comprises at least one carbon black, classified according to ASTM D1765-14, chosen from the group of N110, N115, N121, N134,N20 N220, N234, N299, N326, N330, N339, N343, N347, N375, N539, N550, N650, N660 and N762, with or without silica, the mentioned effect is also observed.

It will be understood that ranges of the iodine adsorption number of the recovered carbon black of between 95 g/kg to 115 g/kg, or 115 g/kg to 140 g/kg, or 140 g/kg to 160 g/kg fall within the range 95 g/kg to 160 g/kg.

The recovered carbon black can be added either as powder or as pellets. The process for obtaining the powder of recovered carbon black and of pelletizing this is described in patent application EP2794766 in the name of the present applicant. Document EP2794766 describes a method for recycling a scrap rubber, in particular tyres, which method comprises the following steps: i) pyrolyzing a scrap rubber to obtain a char material; ii) milling the char material obtained in step i) to obtain a carbon black powder wherein the pyrolysis in step i) comprises at least a two-stage pyrolysis process: a) a first pyrolysis stage to obtain an intermediate char material and b) a second pyrolysis stage to obtain a char material, wherein at least one of the stages a) or b) is carried out in a rotary kiln.

The pellets of recovered carbon black can be formed using a binder or in the absence of it. Binders are used in the wet pelletizing process to control the characteristics of the pellets, such as, pellet size distribution, pellet hardness, or pellet stiffness. The specific type of binder and concentration added in the pelletizing process will influence the pellet characteristics, which will have an influence in the way they disperse when used as fillers. The extent to which the pellets disperse in a rubber composite strongly influence their performance in a rubber composite.

Alternative binders include water soluble plasticisers such as esters with different combinations of structural glycols, polyols and polyacids to impart water solubility or dispersibility. Non-ionic and ionic surfactants can improve dispersibility.

Lignosulphonates or combinations of lignosulphonates, such as sodium, calcium, magnesium, ammonium, can improve dispersability.

The recovered carbon black as described herewith, can comprise a water-soluble plasticizer in a concentration of between 0.01 wt. % and 15 wt. %, based on the weight of the recovered carbon black, and wherein said water-soluble plasticizer is chosen from the group of esters with different combinations of structural glycols, polyols and polyacids.

The pellets of recovered carbon black can have a hardness according to ASTM D5230 of less than 45 g.

The filler may also comprise an amorphous precipitated silica having an iodine adsorption number, measured according to ASTM D-1510-17, of between 30-160 g/kg, of between 150-200 $m^2/g$, which increases the mechanical properties of the composite material when combined with a silane (e.g. Bis-(3-triethoxysilylpropyl)tetra sulphide, also known as Si-69)

The person skilled in the art will understand, than when a composite material is used, e.g. in tyres, at least one of the parameters consisting of rolling resistance, wear resistance and wet grip, needs to be improved, without negatively compromising the other properties. The filler according to the invention, besides improving rolling resistance, i.e. decreases rolling resistance; also improves the aged retention properties of the rubber.

The present inventors have further observed that parameters of the recovered carbon black, which have an influence on the ageing of a composite material comprising a rubber and said filler are: content of ZnS, content of heavy metals, content of each individual heavy metal, content of sulphur, oxygen content. Therefore, ageing and/or mechanical and dynamic properties of a composite material can be improved with a filler comprising recovered carbon black according to the invention, with one or more of the following characteristics:

content of ZnS of less than 3 wt. % and/or content of $SiO_2$ of less than 2 wt. %;

content of heavy metals, excluding Zinc, of less than 300 ppm, preferably less than 250 ppm, more preferably less than 200;

content of any individual heavy metal is less than 20 ppm, preferably less than 15 ppm, more preferably less than 10 ppm;

content of sulphur, excluding sulphur in the form of ZnS, of less than 2 wt. %, wherein said sulphur is present in one or more of the following forms: Carbonile sulphide, Hydrogen sulphide, Carbon disulphide, Dimethyl sulphide, Dimethyl Disulphide, Sulphur dioxide, Methyl sulphide, Methyl mercaptan, Ethyl mercaptan, Isi-propyl mercaptan, Tert-butyl mercaptan, Sec-butyl mercaptan, Pentyl and heavier mercaptans, 2-methylthiophene, 3-methylthiophene, Thiophene, Benzothiophenes, other thiophenes;

an oxygen content, excluding oxygen in $SiO_2$ and metal oxides, of between 0.001 wt. % and 12 wt. %, based on the weight of the recovered carbon black, preferably between 5 wt. % and 12 wt. %; where said oxygen is present in one or more of the following functional groups: carboxylic, lactone, lactol, phenol, carbonyl, anhydride, aldehyde, pyrone, chromene, pyridone, ether and quinone;

based on the weight of the recovered carbon black or the pellets comprising recovered carbon black. These parameters can be changed by exposing the recovered carbon black to in-process modifications (e.g. the amount of oxygen present during the last stages of pyrolysis) or post-oxidative treatments (e.g. by exposing the recovered carbon black to an oxidising medium such as an acid or peroxide or ozone or plasma).

The content of $SiO_2$ in the recovered carbon black, can be reduced to less than 2 wt. %, when using truck tyres or passenger tyres as feedstock in the pyrolysis process as described in patent application EP2794766 in the name of the present applicant.

The recovered carbon black can further comprise a coupling agent, which provides a chemical bond between the powder of recovered carbon black of pellets thereof and the rubber. The coupling agent can be in a concentration of between 0.01 wt. % and 1 wt. %, based on the weight of the recovered carbon black, and wherein the coupling agent is chosen from the group of titanates, neoalkoxy titanates, zirconates, aluminates or combinations thereof.

The filler according to the invention can be used in a composite material comprising a rubber as a matrix and the filler as dispersed particles. The rubber can be chosen from the group of natural rubber (NR), synthetic polyisoprene rubber (IR), solution type styrene butadiene rubber (S-SBR), emulsion type styrene butadiene rubber (E-SBR) and polybutadiene rubber (BR), or a combination thereof.

Moreover, the composite material can comprise one or more additives chosen form the group of zinc oxide, stearic acid, antioxidant, sulphur, accelerator, antiozonant, processing aid, paraffinic, naphthenic, aromatic oil/plasticiser and tackifying resin.

Furthermore, an article comprising the composite material according to one aspect of the invention can be fabricated. The best example of such an article is a tyre; for example, a passenger car tyre, a truck tyre, an agricultural tyre, an OTR (off-the-road) tyre, an aircraft tyre, a solid tyre, a bicycle tyre or a mining tyre.

A tyre is a ring-shaped covering that fits around a wheel's rim to protect it and enable better vehicle performance. Most tires, such as those for automobiles and bicycles, provide traction between the vehicle and the road while providing a flexible cushion that absorbs shock. The materials of modern pneumatic tires are synthetic rubber, natural rubber, fabric and wire, along with carbon black and other chemical compounds. They consist of a tread and a body. The tread provides traction while the body provides containment for a quantity of compressed air.

The performance characteristics of tyres are important, such as rolling resistance, i.e. the resistance to rolling caused by deformation of the tire in contact with the road surface, abrasion and wet traction, i.e. the tire's traction, or grip, under wet conditions.

By making a tyre using the filler according to the invention, the rolling resistance is reduced and ageing is also reduced. This implies that a tyre comprising the composite material according to one aspect of the invention contributes to fuel saving and also has a longer useful life.

It has been found that rolling resistance of tyres can account for as much as 20% of all the losses in the vehicle and hence it is an important road load that needs to be reduced. The filler according to the invention, when added to a rubber matrix material to form a composite material, leads to a 20-25% reduction in rolling resistance, which will yield an approximately 5% of fuel saving for a tyre comprising said composite material.

Fillers known in the art, such as e.g. the filler described in patent application EP2794766 in the name of the present applicant, does not have the desirable balance of improved parameters, such as, contents of certain inorganic compounds or elements in the recovered carbon black, surface chemistry or particle size distribution, which would lead to the combined effect of improved mechanical and dynamic properties and improved ageing retention properties, as is achieved with the filler according to the present application.

One or more objects of the present invention are obtained by the embodiments cited above and in the appended claims.

The invention claimed is:

1. A filler comprising
a recovered carbon black having an iodine adsorption number, measured according to ASTM D-1510-17 of between 95 g/kg and 160 g/kg, and
an amorphous precipitated silica having an iodine adsorption number, measured according to ASTM D-1510-17, of between 30-160 g/kg.

2. The filler of claim 1, wherein said filler further comprises at least one carbon black, classified according to ASTM D1765-14, chosen from the group of N110, N115, N121, N134, N220, N234, N299, N326, N330, N339, N343, N347, N375, N539, N550, N650, N660 and N762.

3. The filler of claim 1, wherein said recovered carbon black has an aggregate particle size weight distribution, of which the D99 percentile is less than 2 μm.

4. The filler of claim 1, wherein said recovered carbon black has a content of ZnS of less than 3 wt. %, based on the weight of the recovered carbon black and/or a content of SiO2 of less than 2 wt. %, based on the weight of the recovered carbon black.

5. The filler of claim 1, wherein said recovered carbon black has a content of heavy metals, excluding Zinc, of less than 300 ppm, based on the weight of the recovered carbon black.

6. The filler of claim 5, wherein the content of any individual heavy metal is less than 20 ppm, based on the weight of the recovered carbon black.

7. The filler of claim 1, wherein said recovered carbon black has a content of Sulphur, excluding sulphur in the form of ZnS, of less than 2 wt. %, based on the weight of the recovered carbon black, wherein said sulphur is present in one or more of the following forms: Carbonyl sulphide, Hydrogen sulphide, Carbon disulphide, Dimethyl sulphide, Dimethyl Disulphide, Sulphur dioxide, Methyl sulphide, Methyl mercaptan, Ethyl mercaptan, Iso-propyl mercaptan, Tert-butyl mercaptan, Sec-butyl mercaptan, Pentyl and heavier mercaptans, 2-methylthiophene, 3-methylthiophene, Thiophene, Benzothiophenes, other thiophenes.

8. The filler of claim 1, wherein said recovered carbon black has an oxygen content, excluding oxygen in SiO2 and metal oxides, of between 0.001 wt. % and 15 wt. %, based on the weight of the recovered carbon black; where said oxygen is present in one or more of the following functional groups: carboxylic, lactone, lactol, phenol, carbonyl, anhydride, aldehyde, pyrone, chromene, 3lastici, ether and quinone.

9. The filler of claim 1, wherein said recovered carbon black comprises a coupling agent in a concentration of between 0.01 wt. % and 1 wt. %, based on the weight of the recovered carbon black, and wherein the coupling agent is chosen from the group of titanates, neoalkoxy titanates, zirconates, aluminates or combinations thereof.

10. The filler of claim 1, wherein said recovered carbon black comprises a water-soluble plasticizer in a concentration of between 0.01 wt. % and 15 wt. %, based on the weight of the recovered carbon black, and wherein said water-soluble plasticizer is chosen from the group of esters with different combinations of structural glycols, polyols and polyacids.

11. Composite material comprising a rubber and a filler according to claim 1.

12. The composite material of claim 11, wherein the rubber is chosen from the group of natural rubber (NR), synthetic polyisoprene rubber (IR), solution type styrene butadiene rubber (S-SBR), emulsion type styrene butadiene rubber (E-SBR) and polybutadiene rubber (BR), or a combination thereof.

13. The composite material of claim 11, wherein said composite material further comprises one or more additives chosen form the group of zinc oxide, stearic acid, antioxidant, sulphur, accelerator, antiozonant, processing aid, paraffinic, naphthenic, aromatic oil/4lasticizer and tackifying resin.

14. A filler comprising
a recovered carbon black having an iodine adsorption number, measured according to ASTM D-1510-17 of between 95 g/kg and 160 g/kg, wherein said recovered carbon black has a content of heavy metals, excluding Zinc, of less than 300 ppm, based on the weight of the recovered carbon black; and
an amorphous precipitated silica having an iodine adsorption number, measured according to ASTM D-1510-17, of between 30-160 g/kg.

15. A filler comprising
a recovered carbon black having an iodine adsorption number, measured according to ASTM D-1510-17 of between 95 g/kg and 160 g/kg,
wherein said recovered carbon black has a content of heavy metals, excluding Zinc, of less than 300 ppm, based on the weight of the recovered carbon black, and
wherein the content of any individual heavy metal is less than 20 ppm, based on the weight of the recovered carbon black, and
an amorphous precipitated silica having an iodine adsorption number, measured according to ASTM D-1510-17, of between 30-160 g/kg.

* * * * *